(12) United States Patent
Perera et al.

(10) Patent No.: US 8,096,475 B2
(45) Date of Patent: Jan. 17, 2012

(54) HANDHELD DATA CAPTURE TERMINAL OPERABLE IN DIFFERENT DATA CAPTURE MODES DEPENDING ON TERMINAL ORIENTATION

(75) Inventors: Warnakulasuriya Jude Perera, Kelaniya (LK); James O. Fagioli, Holtsville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 324 days.

(21) Appl. No.: 12/288,119

(22) Filed: Oct. 16, 2008

(65) Prior Publication Data

US 2010/0096463 A1 Apr. 22, 2010

(51) Int. Cl.
*G06K 7/14* (2006.01)

(52) U.S. Cl. ....................................................... 235/454

(58) Field of Classification Search .... 235/462.01–462.49, 454, 472.01–472.03
See application file for complete search history.

(56) References Cited

U.S. PATENT DOCUMENTS

| | | | | |
|---|---|---|---|---|
| 5,536,930 | A | * | 7/1996 | Barkan et al. ............. 235/472.01 |
| 6,435,413 | B1 | * | 8/2002 | Kumagai et al. ......... 235/462.45 |
| 2006/0208086 | A1 | | 9/2006 | Rudeen et al. |
| 2007/0057067 | A1 | | 3/2007 | He |
| 2007/0092107 | A1 | * | 4/2007 | Danielson et al. ............ 382/100 |
| 2008/0129532 | A1 | | 6/2008 | Bellows |
| 2009/0294541 | A1 | * | 12/2009 | Nunnink ........................ 235/470 |
| 2010/0096463 | A1 | | 4/2010 | Perera et al. |

FOREIGN PATENT DOCUMENTS

| | | |
|---|---|---|
| WO | 2006052803 | 5/2006 |
| WO | 2010045056 | 4/2010 |

OTHER PUBLICATIONS

International Search Report and Written Opinion dated Feb. 5, 2010 in related case PCT/US2009/059542.

* cited by examiner

*Primary Examiner* — Jamara Franklin (57) ABSTRACT

A data capture terminal for, and a method of, automatically capturing data from targets, employ a handheld housing orientable by a human operator in different orientations relative to the targets; a data capture system, preferably including a plurality of actuatable data capture modules, supported by the housing; an orientation sensor supported by the housing for detecting the orientations of the housing relative to the targets, and for generating respective orientation signals in response to the respective detected orientations of the housing; and a controller operatively connected to the orientation sensor, for independently actuating one of the data capture modules for capturing the data from one of the targets in one data capture mode of operation in response to generation of one of the orientation signals, and for actuating another of the data capture modules for capturing the data from another of the targets in another data capture mode of operation in response to generation of another of the orientation signals.

17 Claims, 3 Drawing Sheets

HANDHELD DATA CAPTURE TERMINAL OPERABLE IN DIFFERENT DATA CAPTURE MODES DEPENDING ON TERMINAL ORIENTATION

DESCRIPTION OF THE RELATED ART

Moving laser beam-based readers, also known as laser scanners, have been used to automatically capture data by electro-optically reading coded symbols, particularly one-dimensional Universal Product Code (UPC) type symbols, in supermarkets, warehouse clubs, department stores, and other kinds of retailers for many years. The laser scanner is often configured as a handheld housing aimable by an operator at a symbol to be read. A laser in the housing generates a laser beam directed to the symbol, which is located in a range of working distances from the housing and which is associated with a product, for reflection and scattering from the symbol. A detector having a field of view detects light of variable intensity returning to the housing from the symbol. A scanner scans at least one of the laser beam and the field of view in a scan pattern comprised of one or more scan lines. When at least one of the scan lines sweeps over the symbol, an electrical signal indicative of the intensity of the detected return light is processed by signal processing circuitry including a microprocessor; the symbol is decoded and read; and the product is automatically identified.

Imager-based readers, also known as imaging readers, have also been used to automatically capture data by electro-optically reading targets such as coded symbols, particularly two-dimensional symbols, in a range of working distances from the reader by employing a solid-state imager to capture an image of each symbol. The imaging reader is also often configured as a handheld housing aimable by the operator at the symbol to be read. The imager comprises an array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in digital cameras to capture images.

The imager-based reader further typically includes an illuminator, preferably comprising one or more light emitting diodes (LEDs), to illuminate the symbol during its reading with illumination light emitted from an illumination light source and directed to the symbol for reflection and/or scattering therefrom. The imager-based reader yet further typically includes an aiming light source for projecting an aiming light pattern on the symbol to facilitate aiming of the imager prior to reading, as well as electronic circuitry for producing electrical signals indicative of the light captured by the array, and a microprocessor for processing the electrical signals to decode each captured image.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to automatically capture data by using a handheld camera system to take a picture of a target, such as a person, thing or place. Indeed, the same imager described above can be operated in a monochrome mode for capturing a monochrome image of a symbol to be decoded, and in a color mode for capturing a color image of a different target, such as a picture of a person, thing or place.

Radio frequency identification (RFID) is also known in the field of automatic data capture. A transponder, known generally as a tag or target, is attached to an object and communicates wirelessly with an RFID reader. RFID technology is used in a variety of applications including retail, industrial, transportation, tracking, security, animal identification and individual identification. Transfer of data via RFID technology may be used, for example, for indicating the presence of the object, such as in electronic article surveillance (EAS), for obtaining data associated with the object or for identifying the object. In an automatic identification system, the tag is typically programmed with unique information, such as encoded data including an identifying code. The RFID reader includes an antenna that emits radio carrier signals to activate the tag and read data from it, and a microprocessor or decoder for decoding the data read. The tag responds to the signal by modulating the carrier signal in accordance with the encoded data.

RFID technology allows for non-contact target reading. The RFID reader may be a mobile reader, and configured as a handheld housing. The electromagnetic field generated by the antenna may be constant or activated by an actuator such as a sensor or a trigger. Advantages to RFID technology include non-contact reading without the need for line-of-sight interrogation.

As advantageous as the known handheld systems have been in capturing data including images, they have not proven to be altogether satisfactory in use, especially when different types of data are presented for capture. Typically, the operator grasps and holds the respective handheld system in his or her hand during data capture and aims the respective handheld system at the target from which data is to be captured. Providing separate handheld data capture systems for the operator to handle is undesirable. When different data capture systems are combined into a single hybrid handheld housing, accidental data captures can occur, and the operator sometimes does not know which data capture system performed the data capture.

To minimize accidental data captures, the art has proposed independently actuating each data capture system by having the operator manually actuate a trigger mechanism with one or more of his or her fingers. The trigger mechanism may have separate manual triggers, one for each data capture system, or be a programmed switch able to recognize different triggering actions each unique to a respective data capture system. Independent trigger actuation helps to avoid accidentally capturing data from the wrong target or from the wrong data capture system, but it comes at the expense of providing, supporting and operating a complex trigger mechanism.

SUMMARY OF THE INVENTION

One feature of the present invention resides, briefly stated, in a data capture terminal for, and a method of, automatically capturing data from targets. The terminal is configured with a handheld housing orientable by a human operator in different orientations relative to the targets. The housing preferably has a plurality of light-transmissive windows. A data capture system is supported by the housing for capturing the data from one of the targets in one data capture mode of operation, and from another of the targets in another data capture mode of operation.

An orientation sensor is also supported by the housing for detecting the orientations of the housing relative to the targets, and for generating respective orientation signals in response to the respective detected orientations of the housing. Preferably, the orientation sensor is an accelerometer or a gyroscope, and each orientation signal has an amplitude proportional to a direction of the detected orientation of the housing. The housing extends along three mutually perpendicular axes, and the orientation sensor is operative for detecting a change in the orientation of the housing relative to at least one of the axes. A controller, preferably responsive to manual actuation of a trigger, is operatively connected to the orientation sensor, for actuating the one data capture mode in response to one of the orientation signals, and for actuating the other data capture mode in response to another of the orientation signals.

In one embodiment, the data capture system includes a single actuatable solid-state imager operative for capturing the data from the one target as a monochrome image of a symbol to be decoded in the one data capture mode, and from the other target as a color image of a non-symbol target to be imaged in the other data capture mode. The controller is operative for decoding the symbol in the one data capture mode, and for processing and displaying the non-symbol target in the other data capture mode.

In another embodiment, the data capture system includes a plurality of actuatable data capture modules, and the controller is operative for independently actuating each data capture module in response to the respective orientation signals. One of the data capture modules preferably is a laser scanning module for electro-optically reading indicia, especially one- and/or two-dimensional symbols. Each symbol includes elements of different light reflectivity, e.g., bars and spaces. The laser scanning module includes electro-optical components supported by the housing and includes a scanner for scanning at least one of a laser beam from a laser and a field of view of a light detector through one of the windows in a scan pattern, typically comprised of one or more scan lines, across the indicia during reading. The laser scanning module may also include signal processing circuitry for processing an electrical analog signal generated by the light detector, and a digitizer for converting the analog signal to a digital signal for subsequent decoding by a controller or programmed microprocessor.

Another of the data capture modules preferably is an imaging module, also for electro-optically reading indicia, especially one- and/or two-dimensional symbols. The imaging module includes electro-optical components supported by the housing, and includes a one- or two-dimensional, solid-state imager. The imager has an array of image sensors operative, together with an imaging lens assembly, for capturing return light reflected and/or scattered from a one- or two-dimensional symbol through another of the windows during the reading to process and decode a captured image of the symbol with the aid of a controller or programmed microprocessor. Preferably, the array is a CCD or a CMOS array. The imaging module preferably includes an illuminator for illuminating the symbol during the reading with illumination light directed from an illumination light source. The illumination light source comprises one or more light emitting diodes (LEDs). The illuminator is especially useful when the imager is operated in low light or dark ambient environments, but could equally well be used at normal indoor lighting levels. An aiming light assembly can be used to generate an aiming light pattern or mark useful to locate the symbol prior to reading.

Still another of the data capture modules preferably is a radio frequency identification (RFID) module supported by the housing for reading an RFID tag or transponder to obtain the data. The RFID module includes an antenna that emits radio carrier signals to activate the tag and read the data from it, and a controller or programmed microprocessor is operative for decoding the data read. The tag responds to the signal by modulating the carrier signal in accordance with the encoded data.

Yet another of the data capture modules is a handheld camera module operative for taking a picture of a target, such as a person, thing or place. Indeed, the same imager described above can be operated, preferably in a color mode for capturing a color image of a non-symbol target, such as a picture of a person, thing or place. The imager has an array of image sensors operative, together with an imaging lens assembly, for capturing return light reflected and/or scattered from the non-symbol target during the image capture to process a captured image of the non-symbol target with the aid of a controller or programmed microprocessor.

During handheld data capture, the housing is held and moved by the operator and at least one of its windows is aimed at, or presented to, the target, e.g., a symbol, a tag, or a non-symbol target such as a person, place or thing. Different windows can be used for different types of targets. The housing or a selected window can be oriented relative to the target in virtually any orientation, e.g., in a horizontal plane, in a vertical plane, or diagonally in an inclined plane relative to the horizontal and vertical planes, and can be moved along or turned about any one or more of the three mutually perpendicular, width, height, and depth axes (X, Y. Z) of the housing.

The orientation sensor detects the orientation, and preferably whether that orientation lies within an error range of values, e.g., plus or minus 20 degrees, and then enables for operation only one of the modules, i.e., the one determined in advance to be best suited for capturing data from that type of target. For example, the camera module could be predetermined as being best suited for capturing an image of a non-symbol target, i.e., taking a photograph, when the housing and one of its windows are oriented in the horizontal plane and/or in the vertical plane, and the imaging module could be predetermined as being best suited for capturing an image of a symbol to initiate decoding thereof when the housing is in the inclined plane, or turned angularly about its height axis (Y). Alternatively, the imaging module could be predetermined as being best suited for capturing an image of the symbol to initiate decoding thereof when the housing is inverted in the vertical plane and/or when the housing is in the horizontal plane and turned. Other orientations and other actuations of the other modules by the trigger-actuated controller are contemplated by, and constitute part of, this invention, each module actuation being unique to a particular range of predetermined orientations.

Thus, the operator need no longer have to operate separate manual triggers, one for each data capture module, or a complex programmed switch to recognize different triggering actions each unique to a respective data capture module. Accidental capturing of data from the wrong target or from the wrong data capture module are avoided.

Another aspect of this invention resides in a plurality of different indicators, each dedicated to a respective mode or module for indicating a successful data capture of the respective mode or module. For example, an auditory beeper that generates different sounds, or visible lights that generate different colors, can be used to advise the operator which module successfully decoded a particular target type.

Another aspect of the invention still further resides in a method of automatically capturing data from targets performed by the steps of orienting a handheld housing by a human operator in different orientations relative to the targets, capturing the data from one of the targets in one data capture mode of operation, capturing the data from another of the targets in another data capture mode of operation, detecting the orientations of the housing relative to the targets, generating respective orientation signals in response to the respective detected orientations of the housing, and independently actuating each data capture mode in response to the respective orientation signals. Preferably, the capturing steps are performed by a plurality of actuatable data capture modules, and the actuating step is performed by independently actuating each data capture module in response to the respective orientation signals.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
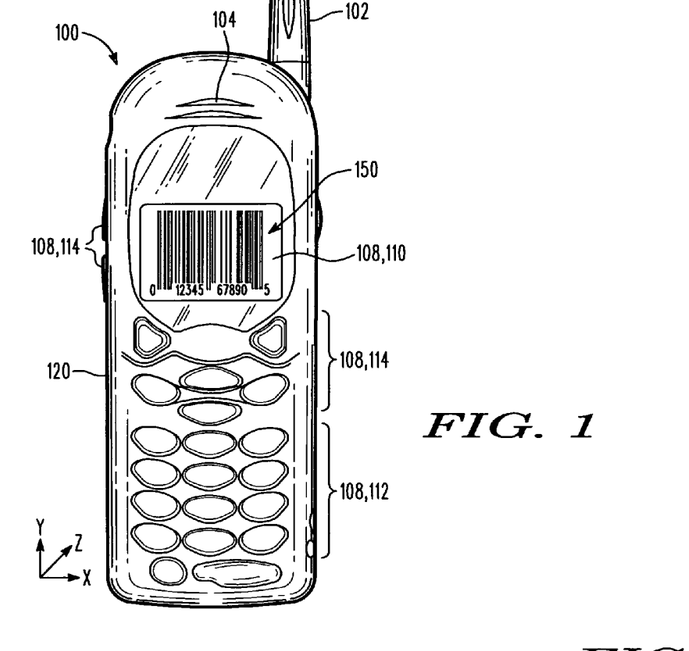
FIG. 1 is a front elevational view of a data capture terminal configured as a radiotelephone, for capturing data of different types in accordance with this invention.

A portable data capture terminal for, and a method of, automatically capturing data from targets, such as bar code symbols, non-symbol targets, RFID tags and like targets, according to the present invention, is generally shown in FIG. 1 as a radiotelephone 100, such as a cellular telephone operable in a cellular telephone system. Although a radiotelephone 100 is shown in FIG. 1, one skilled in the art will recognize that the features discussed hereinbelow will also find application in other mobile computers, such as personal digital assistants (PDAs), audio and/or video players, portable gaming systems, radios, video cameras, scanners, pagers, video telephones, handheld computers, and other handheld electronic devices, especially those having network access, and the radiotelephone 100 or data capture terminal described herein shall refer to each of these and their equivalents.

As shown in FIG. 1, the radiotelephone 100 includes a housing 120, a radio frequency (RF) antenna 102 for sending and receiving RF signals to and front a cellular base station of a communications network, speaker apertures 104 for directing audio information from an internal speaker to a user or operator, a microphone aperture 106 for directing audio information from the user to an internal microphone, and a user interface 108 for interacting with the user to provide output information to, and receive input information from, the user. The user interface 108 includes, but is not limited to, a liquid crystal display (LCD) 110 that is able to display alphanumeric and graphical image data such as the image 150, a keypad 112, and a plurality of selection buttons 114 at the front and sometimes at the side of the housing 120.

Figure 2:
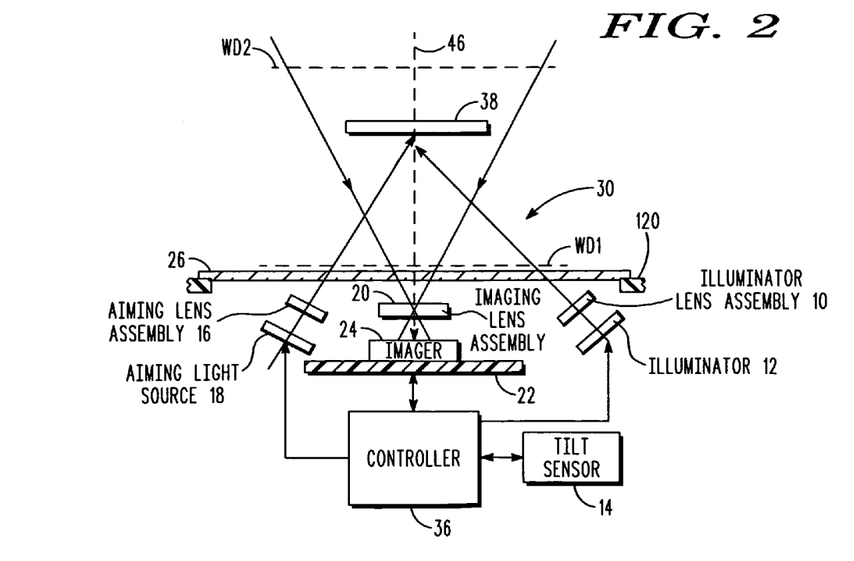
FIG. 2 is a part-diagrammatic, part-sectional view of a housing of the terminal of FIG. 1 schematically depicting a single imager operative for capturing data in different data capture modes in accordance with one embodiment of this invention.

As shown in FIG. 2, the housing 120 has a data capture system 30 behind a generally planar window 26, preferably on a rear of the housing. The data capture system 30 is operative for capturing data from different targets in different data capture modes of operation, and includes a single imager 24 mounted on a printed circuit board 22 in the housing. The imager 24 is a solid-state device, for example, a CCD or a CMOS imager having a one-dimensional array of addressable image sensors or pixels arranged in a single, linear row or a two-dimensional array of such sensors arranged in mutually orthogonal rows and columns, and operative for detecting return light captured by an imaging lens assembly 20 along an optical path or axis 46 through the window 26. The return light is scattered and/or reflected from a target or symbol 38 over a field of view. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager 24, and WD2 can be many feet from the window 26, for example, around fifty feet away.

An illuminating assembly is also mounted in the housing and preferably includes an illuminator or illuminating light source 12, e.g., a light emitting diode (LED), and an illuminating lens assembly 10 to uniformly illuminate the symbol 38 with an illuminating light. The LED 12 is preferably pulsed. An aiming assembly is also mounted in the housing and preferably includes an aiming light source 18, e.g., an LED, and an aiming lens assembly 16 for generating a visible aiming light pattern on the symbol 38. The aiming pattern is useful to help the operator accurately aim the housing at the symbol 38. The imager 24, the illuminating light source 12 and the aiming light source 18 are operatively connected to a controller or microprocessor 36 operative for controlling the operation of these components. Preferably, the microprocessor is the same as the one used for decoding and/or processing the return light from the captured target images.

A tilt or orientation sensor 14 is also supported by the housing 120 for detecting the orientations of the housing 120 relative to the targets, and for generating respective output orientation signals in response to the respective detected orientations of the housing 120. Preferably, the orientation sensor 14 is an accelerometer, a gyroscope, or some other mechanical device operative for generating each output orientation signal with an amplitude proportional to a direction of the detected orientation of the housing 120. The housing 120 extends along three mutually perpendicular axes (X, Y, Z)

that respectively extend widthwise (X), heightwise (Y), and depthwise (Z) along the housing, and the orientation sensor 14 is operative for detecting a change in the orientation of the housing 120 relative to at least one of the axes.

The controller 36, preferably responsive to manual actuation of a trigger, e.g., depression of one of the selector buttons 114, is operatively connected to the orientation sensor 14, for actuating the one data capture mode in response to one of the orientation signals, and for actuating the other data capture mode in response to another of the orientation signals. More particularly, the imager 24 of the data capture system 30 in the embodiment of FIG. 2 is operative for capturing the data from the one target 38 as a monochrome image 150 of a symbol to be decoded in the one data capture mode, and from another target as a color image of a non-symbol target to be imaged in the other data capture mode. The controller 36 is operative for decoding the symbol in the one data capture mode, and for processing and displaying the non-symbol target in the other data capture mode. In operation, the controller 36 sends a command signal to energize the aiming light source 18 prior to data capture, and also pulses the illuminating light source 12 and energizes and exposes the imager 24 to collect light, e.g., illumination light and/or ambient light, from the target for a time period of say 500 microseconds or less. A typical array needs about 33 milliseconds to acquire the entire target image and operates at a frame rate of about 30 frames per second.

Figure 3:
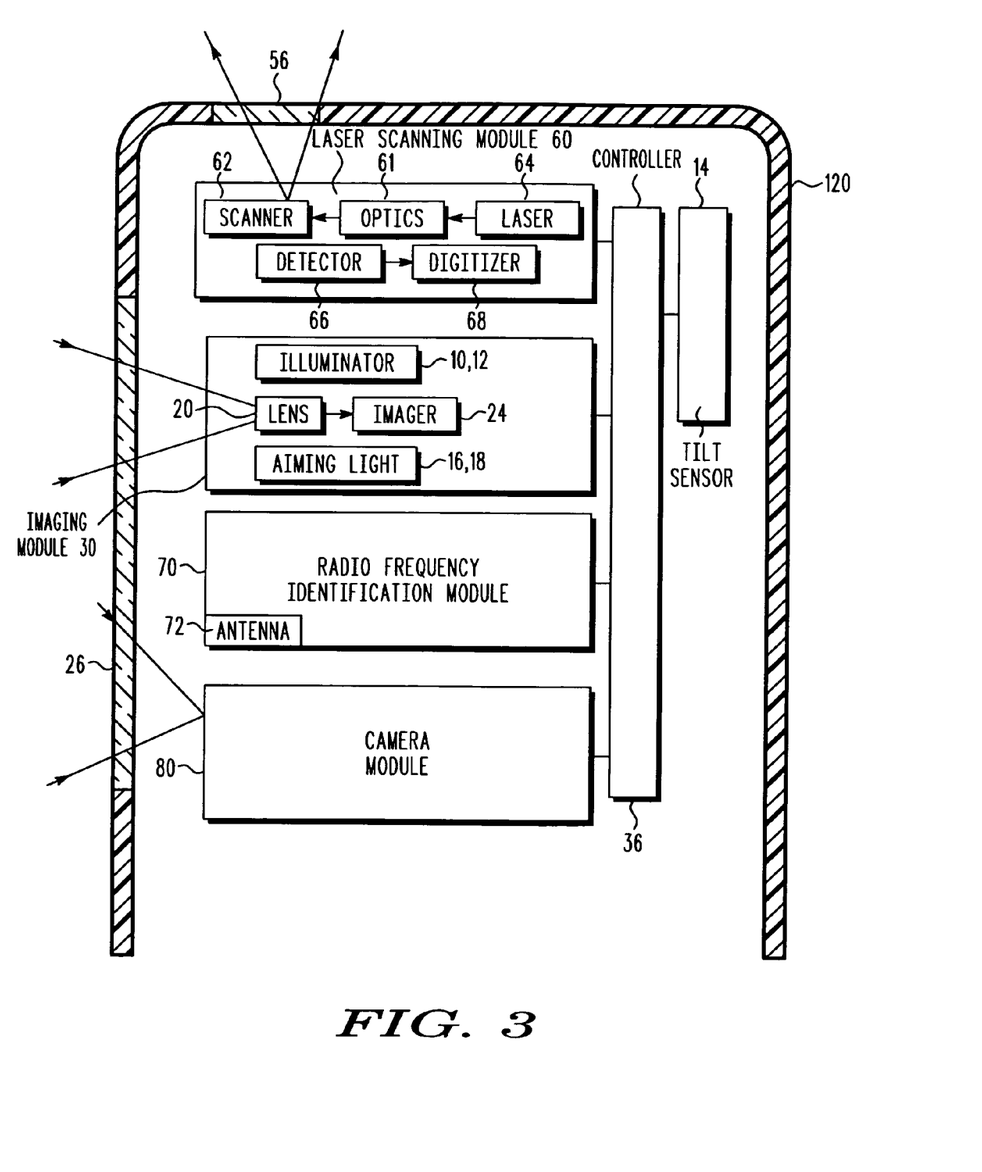
FIG. 3 is a broken-away, part-diagrammatic, part-sectional view of the terminal of FIG. 1 depicting a plurality of data capture modules in accordance with another embodiment of this invention.

In another embodiment, as illustrated in FIG. 3, the data capture system includes a plurality of actuatable data capture modules 30, 60, 70, 80, all supported by the same housing 120, and the controller 36, which is shared by all the modules, is operative for independently actuating each data capture module in response to the respective orientation signals generated by the orientation sensor 14, which is likewise shared by all the modules. FIG. 3 also shows that there is preferably another generally planar window 56, preferably on a top of the housing 120.

One of the data capture modules preferably is the above-mentioned imaging module 30 operative, in the monochrome mode, for electro-optically reading indicia, especially one- and/or two-dimensional symbols. The imaging module 30 includes the one- or two-dimensional, solid-state imager 24 having the array of image sensors operative, together with the imaging lens assembly 20, for capturing return light reflected and/or scattered from a one- or two-dimensional symbol through the window 26 during the reading to process and decode a captured image 150 of the symbol 38 with the aid of the controller or programmed microprocessor 36. Preferably, the array is a CCD or a CMOS array having a 752×480 resolution (wide VGA), although other resolution sizes are possible. The array may have on the order of one million addressable image sensors. The imaging module 30 preferably includes the illuminator assembly 10, 12 for illuminating the symbol during the reading with illumination light directed from all illumination light source 12. The illumination light source 12 comprises one or more light emitting diodes (LEDs). The illuminator is especially useful when the imager 24 is operated in low light or dark ambient environments, but could equally well be used at normal indoor lighting levels. The aiming light assembly 16, 18 can be used to generate an aiming light pattern or mark useful to locate the symbol 38 prior to reading.

Another of the data capture modules preferably is a laser scanning module 60, also for electro-optically reading indicia, especially one- and/or two-dimensional symbols. The laser scanning module 60 includes a scanner 62 for scanning at least one of a laser beam from a laser 64 and a field of view of a light detector 66 through the top window 56 in a scan pattern, typically comprised of one or more scan lines, across the indicia during reading. The laser scanning module may also include optics 61 for focusing the laser beam to have a large depth of field, signal processing circuitry for processing an electrical analog signal generated by the light detector 66, and a digitizer 68 for converting the analog signal to a digital signal for subsequent decoding by the controller or programmed microprocessor 36. In operation of the laser scanning module 60, the controller 36 energizes the laser 64 to emit the laser beam, and energizes the scanner 62 to sweep the laser beam in the scan pattern. The controller 36 also processes the digitized signal from the digitizer 68 into data descriptive of the symbol.

Still another of the data capture modules preferably is a radio frequency identification (RFID) module 70 supported by the housing 120 for reading all RFID tag or transponder to obtain the data. The RFID module 70 includes an antenna 72 that emits radio carrier signals to activate the tag and read the data from it, and the controller 36 is operative for decoding the data read. The tag responds to the signal by modulating the earlier signal in accordance with the encoded data.

Yet another of the data capture modules is a camera module 80 operative for taking a picture of a non-symbol target, such as a person, thing or place. Indeed, a camera imager, just like the imager 24 described above can be operated, preferably in a color mode for capturing a color image of the non-symbol target. The camera imager has an array of image sensors operative, together with an imaging lens assembly, for capturing return light reflected and/or scattered from the non-symbol target during the image capture to process and display a captured image of the non-symbol target with the aid of the controller or programmed microprocessor 36.

During handheld data capture, the housing 120 is held and moved by the operator and at least one of its windows 26, 56 is aimed at, or presented to, the target, e.g., a symbol, a tag, or a non-symbol person, place or thing. Different windows 26, 56 can be used for different types of targets. The housing 120 or a selected window 26 or 56 can be oriented relative to the target in virtually any orientation, e.g., in a horizontal plane, in a vertical plane, or diagonally in an inclined plane relative to the horizontal and vertical planes, and can be moved along or turned about any one or more of the three mutually perpendicular, width, height, and depth axes (X, Y, Z) of the housing 120.

Figure 4:
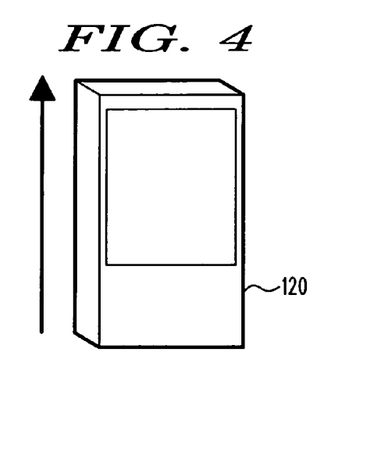
FIG. 4 is a diagram depicting the terminal of FIG. 1 in one orientation relative to a target from which data is to be captured.
Figure 5:
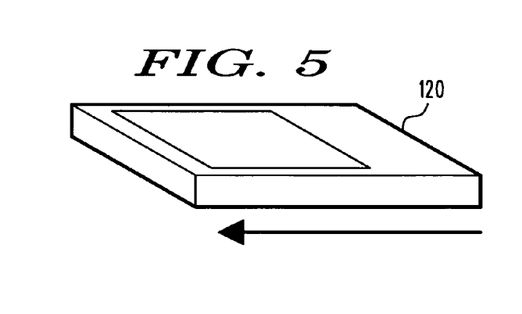
FIG. 5 is a diagram depicting the terminal of FIG. 1 in another orientation relative to a target from which data is to be captured.
Figure 6:
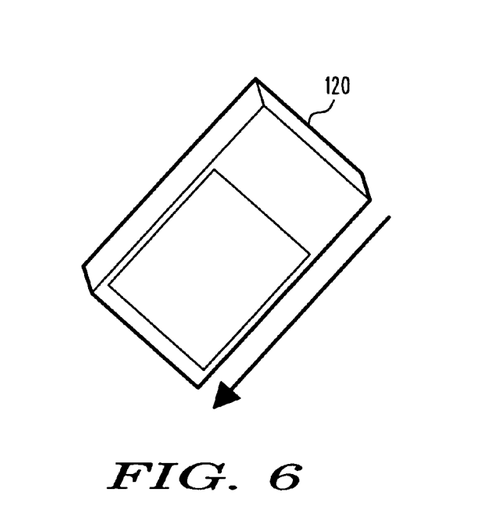
FIG. 6 is a diagram depicting the terminal of FIG. 1 in still another orientation relative to a target from which data is to be captured.
Figure 7:
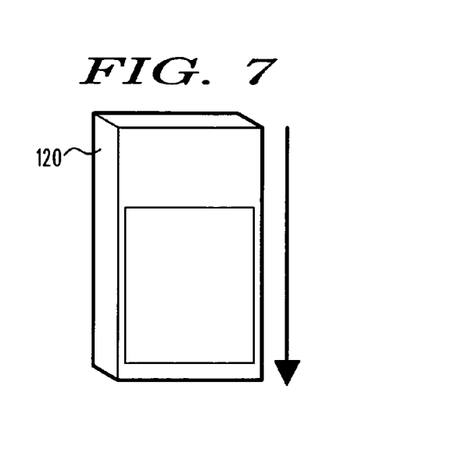
FIG. 7 is a diagram depicting the terminal of FIG. 1 in yet another orientation relative to a target from which data is to be captured.
Figure 8:
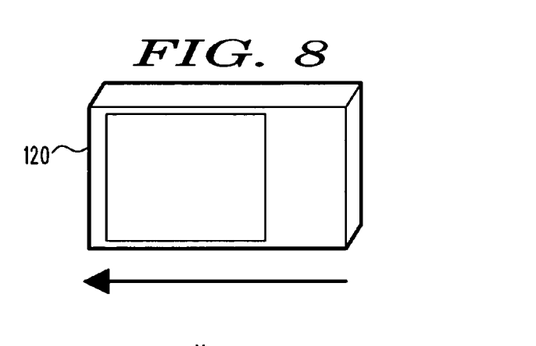
FIG. 8 is a diagram depicting the terminal of FIG. 1 in an additional orientation relative to a target from which data is to be captured.
Figure 9:
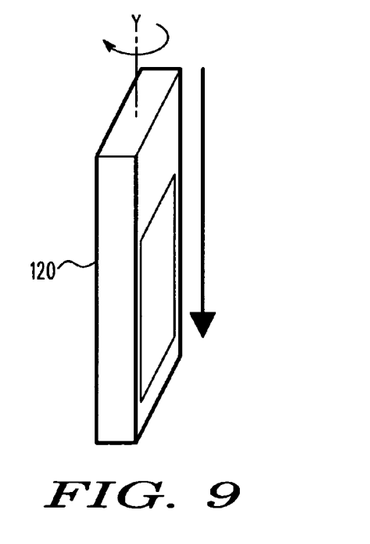
FIG. 9 is a diagram depicting the terminal of FIG. 1 in a further orientation relative to a target from which data is to be captured.

The orientation sensor 14 detects the orientation, and preferably whether that orientation lies within an error range of values, e.g., plus or minus 20 degrees, and then enables for operation only one of the modules 30, 60, 70, 80, i.e., the one determined in advance to be best suited for capturing data from that type of target. For example, the camera module 80 could be predetermined as being best suited for capturing an image of a non-symbol target, i.e., taking a photograph, when the housing 120 and one of its windows, e.g., rear window 26 are oriented upright in the vertical plane (see FIG. 4) and/or in the horizontal plane (see FIG. 5), and the imaging module 30 could be predetermined as being best suited for capturing through the other of its windows, e.g., top window 56, an image of a symbol to initiate decoding thereof when the housing 120 is in an inclined plane (see FIG. 6), or turned angularly about its height axis Y (see FIG. 9). Alternatively, the imaging module 30 could be predetermined as being best suited for capturing an image of the symbol to initiate decoding thereof when the housing 120 is inverted in the vertical plane with its window 56 facing down (see FIG. 7) and/or when the housing 120 is in the horizontal plane with its window 56 facing out to the side (see FIG. 8). Orientations, other than those illustrated in FIGS. 4-9, and other actuations of the other modules by the trigger-actuated controller 36 are contemplated by, and form part of, this invention, each module actuation being unique to a particular range of predetermined orientations.

Thus, the operator need no longer have to operate separate manual triggers, one for each data capture module 30, 60, 70, 80, or a complex programmed switch to recognize different triggering actions each unique to a respective data capture module. Accidental capturing of data from the wrong target or from the wrong data capture module are avoided.

A plurality of different indicators, each dedicated to a respective mode or module 30, 60, 70, 80 for indicating a successful data capture of the respective mode or module can be provided on the housing 120. For example, an auditory beeper that generates different sounds, or visible lights that generate different colors, can be used to advise the operator which mode or module successfully decoded a particular target type.

It will be understood that each of the elements described above, or two or more together, also may find a useful application in other types of constructions differing from the types described above. Thus, terminals having different configurations, or different data capture modules, or more or fewer data capture modules, can be used.

While the invention has been illustrated and described as a data capture terminal operative in different modes or modules in dependence of the orientation of the terminal in accordance with a method of performing such data capture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A data capture terminal for automatically capturing data from targets, comprising:
    a handheld housing orientable by a human operator in different orientations relative to the targets;
    a data capture system supported by the housing for capturing the data comprising an imager operative for capturing the data from one of the targets as a monochrome image of a symbol to be decoded in one data capture mode of operation, and for capturing a color image of a non-symbol target to be imaged from another of the targets in another data capture mode of operation;
    an orientation sensor supported by the housing for detecting the orientations of the housing relative to the targets, and for generating respective orientation signals in response to the respective detected orientations of the housing; and
    a controller operatively connected to the orientation sensor, for actuating the imager in the one data capture mode for capturing the data from the one of the targets as a monochrome image in response to one of the orientation signals, and for actuating the imager in the other data capture mode for capturing a color image of the non-symbol target from the other of the targets in response to another of the orientation signals.

2. The terminal of claim 1, wherein the imager includes a single actuatable solid-state imager operative for capturing the data from said one of the targets as the monochrome image of the symbol to be decoded in said one data capture mode, and from said other of the targets as the color image of the non-symbol target to be imaged in said other data capture mode; and wherein the controller is operative for decoding the symbol in said one data capture mode, and for processing the non-symbol target in said other data capture mode.

3. The terminal of claim 1, wherein the data capture system includes a plurality of actuatable data capture modules; and wherein the controller is operative for independently actuating each data capture module in response to the respective orientation signals.

4. The terminal of claim 3, wherein at least two of the data capture modules are selected from a group consisting of an actuatable laser scanning module for electro-optically reading symbols to obtain the data by scanning the symbols, an actuatable imaging module for electro-optically reading symbols to obtain the data by capturing an image of the symbols, an actuatable camera for imaging non-symbol targets to obtain the data by capturing an image of the non-symbol targets, and an actuatable radio frequency identification (RFID) module for interrogating and reading an RFID tag to obtain the data.

5. The terminal of claim 4, wherein the laser scanning module includes a scanner for scanning at least one of a laser beam from a laser and a field of view of a light detector in a scan pattern across the symbols during reading; wherein the imaging module includes a solid-state imager having an array of image sensors for capturing return light from the symbols during reading; wherein the camera module includes a solid-state imager having an array of image sensors for capturing return light from the non-symbol targets during image capture; and wherein the RFID module includes an antenna for propagating a radio frequency field during reading.

6. The terminal of claim 3, wherein the housing has a plurality of light transmissive windows; wherein light passes through one of the windows in said one data capture mode; and wherein light passes through another of the windows in said other data capture mode.

7. The terminal of claim 1, wherein the orientation sensor is one of an accelerometer and a gyroscope, and wherein each orientation signal has an amplitude proportional to a direction of the detected orientation of the housing.

8. The terminal of claim 7, wherein the housing extends along three mutually perpendicular axes, and wherein the orientation sensor is operative for detecting a change in the orientation of the housing relative to at least one of the axes.

9. A data capture terminal for automatically capturing data from targets, comprising:
    a handheld housing orientable by a human operator in different orientations relative to the targets;
    a data capture system supported by the housing comprising an imager operative for capturing the data from one target as a monochrome image of a symbol to be decoded in one data capture mode of operation, and for capturing a color image of a non-symbol target to be imaged from another of the targets in another data capture mode of operation;
    an orientation sensor supported by the housing for detecting the orientations of the housing relative to the targets, and for generating respective orientation signals in response to the respective detected orientations of the housing; and
    a controller operatively connected to the orientation sensor, for actuating the imager for capturing the data from the one of the targets as a monochrome image in the one data capture mode of operation in response to generation of one of the orientation signals, and for capturing the data from the other of the targets as a color image in the other data capture mode of operation in response to generation of another of the orientation signals.

10. A method of automatically capturing data from targets, comprising the steps of:
orienting a handheld housing by a human operator in different orientations relative to the targets;
capturing the data from one of the targets as a monochrome image of a symbol to be decoded in one data capture mode of operation, and for capturing a color image of a non-symbol target to be imaged from another of the targets in another data capture mode of operation;
detecting the orientations of the housing relative to the targets, and generating respective orientation signals in response to the respective detected orientations of the housing; and
actuating the one data capture mode for capturing the data from the one of the targets as a monochrome image in response to one of the orientation signals, and actuating the other data capture mode for capturing a color image of the non-symbol target from the other of the targets in response to another of the orientation signals.

11. The method of claim 10, wherein the capturing step is performed by a single actuatable solid-state imager operative for capturing the data from said one target as the monochrome image of the symbol to be decoded in said one data capture mode, and from said other target as the color image of the non-symbol target to be imaged in said other data capture mode; and the steps of decoding the symbol in said one data capture mode, and processing the non-symbol target in said other data capture mode.

12. The method of claim 10, wherein the capturing step is performed by a plurality of actuatable data capture modules; and wherein the actuating steps are performed by independently actuating each data capture module in response to the respective orientation signals.

13. The method of claim 12, and the step of selecting at least two of the data capture modules from a group consisting of an actuatable laser scanning module for electro-optically reading symbols to obtain the data by scanning the symbols, an actuatable imaging module for electro-optically reading symbols to obtain the data by capturing an image of the symbols, an actuatable camera for imaging non-symbol targets to obtain the data by capturing an image of the non-symbol targets, and an actuatable radio frequency identification (RFID) module for interrogating and reading an RFID tag to obtain the data.

14. The method of claim 13, and the step of configuring the laser scanning module with a scanner for scanning at least one of a laser beam from a laser and a field of view of a light detector in a scan pattern across the symbols during reading; and the step of configuring the imaging module with a solid state imager having an array of image sensors for capturing return light from the symbols during reading; and the step of configuring the camera module with a solid-state imager having an array of image sensors for capturing return light from the non-symbol targets during image capture; and the step of configuring the RFID module with an antenna for propagating a radio frequency field during reading.

15. The method of claim 12, and the step of configuring the housing with a plurality of light-transmissive windows; and the step of passing light through one of the windows in said one data capture mode; and the step of passing light through another of the windows in said other data capture mode.

16. The method of claim 10, wherein the detecting step is performed by one of an accelerometer and a gyroscope, and wherein the generating step is performed by generating each orientation signal with an amplitude proportional to a direction of the detected orientation of the housing.

17. The method of claim 16, and the step of configuring the housing to extend along three mutually perpendicular axes, and wherein the detecting step is performed by detecting a change in the orientation of the housing relative to at least one of the axes.

* * * * *

UNITED STATES PATENT AND TRADEMARK OFFICE
CERTIFICATE OF CORRECTION

| | | |
|---|---|---|
| PATENT NO. | : 8,096,475 B2 | Page 1 of 1 |
| APPLICATION NO. | : 12/288119 | |
| DATED | : January 17, 2012 | |
| INVENTOR(S) | : Perera et al. | |

It is certified that error appears in the above-identified patent and that said Letters Patent is hereby corrected as shown below:

In Column 4, Line 27, delete "(X, Y. Z)" and insert -- (X, Y, Z) --, therefor.

In Column 6, Line 7, delete "front" and insert -- from --, therefor.

In Column 6, Line 27, delete "row" and insert -- row, --, therefor.

In Column 7, Line 55, delete "all" and insert -- an --, therefor.

In Column 8, Line 17, delete "all" and insert -- an --, therefor.

In Column 8, Line 22, delete "earlier" and insert -- carrier --, therefor.

In Column 8, Line 54, delete "26" and insert -- 26, --, therefor.

Signed and Sealed this
Eighteenth Day of December, 2012

David J. Kappos
*Director of the United States Patent and Trademark Office*